United States Patent
Haarlemmer

(10) Patent No.: US 12,473,689 B2
(45) Date of Patent: Nov. 18, 2025

(54) METHOD FOR THE GASIFICATION OF A BLACK LIQUOR

(71) Applicant: COMMISSARIAT À L'ENERGIE ATOMIQUE ET AUX ÉNERGIES ALTERNATIVES, Paris (FR)

(72) Inventor: Geert Haarlemmer, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 35 days.

(21) Appl. No.: 18/253,648

(22) PCT Filed: Nov. 22, 2021

(86) PCT No.: PCT/FR2021/052055
§ 371 (c)(1),
(2) Date: May 19, 2023

(87) PCT Pub. No.: WO2022/106794
PCT Pub. Date: May 27, 2022

(65) Prior Publication Data
US 2023/0416986 A1    Dec. 28, 2023

(30) Foreign Application Priority Data
Nov. 23, 2020  (FR) ....................... 2012022

(51) Int. Cl.
*D21C 11/00* (2006.01)
*C10J 3/78* (2006.01)
*D21C 11/12* (2006.01)

(52) U.S. Cl.
CPC ............ *D21C 11/0007* (2013.01); *C10J 3/78* (2013.01); *D21C 11/0042* (2013.01);
(Continued)

(58) Field of Classification Search
CPC ............ D21C 11/0007; D21C 11/0042; D21C 11/0057; D21C 11/0092; D21C 11/125; C10J 3/78; Y02P 20/54
See application file for complete search history.

(56) References Cited

U.S. PATENT DOCUMENTS 5,582,715 A * 12/1996 McBrayer, Jr. .......... B01J 3/008
                                                     422/111
2023/0235507 A1 * 7/2023 Joronen .................... B01J 19/18
                                                     162/16

FOREIGN PATENT DOCUMENTS

| CN | 101314495 A * | 12/2008 | |
| JP | 4105171 B2 | 6/2008 | |
| WO | WO-2018115593 A1 * | 6/2018 | ............ B01J 3/008 |

OTHER PUBLICATIONS

English machine translation of CN101314495AI, 2008. (Year: 2008).*
(Continued)

*Primary Examiner* — Anthony Calandra
(74) *Attorney, Agent, or Firm* — Chrisman Gallo Tochtrop LLC

(57) ABSTRACT

A method for transforming a black liquor, comprising the following steps: a) supplying a black liquor, b) gasifying the black liquor by means of supercritical water gasification in the presence of a hydrogenated carbon-free fuel, by means of which reaction products are formed, c) cooling the reaction products, by means of which a gaseous mixture is obtained which comprises at least methane and a green liquor comprising at least sulphur in the form of NaHS, $Na_2S$ and $H_2S$.

15 Claims, 1 Drawing Sheet

(52) U.S. Cl.
CPC ...... *D21C 11/0057* (2013.01); *D21C 11/0092* (2013.01); *D21C 11/125* (2013.01)

(56) References Cited

OTHER PUBLICATIONS

Lunde, P.J. and F.L. Kester, Carbon Dioxide Methanation on a Ruthenium Catalyst. Industrial & Engineering Chemistry Process Design and Development, 1974. 13(1): p. 27-33.

Hong, G.T. and M.H. Spritzer, Supercritical Water Partial Oxydation, in Proceedings of the 2002 U.S. DOE Hydrogen Program Review 2002.

Sricharoenchaikul V. "Assessment of black liquor gasification in supercritical water" Bioresource Technology, Jan. 1, 2009, vol. 100, No. 2, pp. 638-643.

Naqvi, M. et al. "Bio-refinery system of DME or CH4 production from black liquor gasification in pulp mills" Bioresource Technology, Elsevier, Feb. 1, 2010, vol. 101, No. 3, pp. 937-944.

DeBlasio, Cataldo et al. "A study on supercritical water gasification of black liquor conducted in stainless steel and nickel-chromium-molybdenum reactors : A study on supercritical water gasification" A Journal of Chemical Technology and Biotechnology, Feb. 9, 2016, vol. 91. No. 10, pp. 2664-2678.

Frusteri, F., et al., Methane production by sequential supercritical gasification of aqueous organic compounds and selective CO2 methanation. Applied Catalysis A: General, 2017. 545: p. 24-32.

Cao, W., et al., Assessment of sugarcane bagasse gasification in supercritical water for hydrogen production. International Journal of Hydrogen Energy, 2018. 43(30): p. 13711-13719.

Written Opinion for PCT/FR2021/052055 dated Mar. 14, 2022.

International Search Report for PCT/FR2021/052055 dated Mar. 14, 2022.

* cited by examiner

METHOD FOR THE GASIFICATION OF A BLACK LIQUOR

CROSS-REFERENCE TO RELATED APPLICATIONS

This is a National Stage application of PCT international application PCT/FR2021/052055, filed on Nov. 22, 2021, which claims the priority of French Patent Application No. FR 2012022, filed Nov. 23, 2020, both of which are incorporated herein by reference in their entirety.

TECHNICAL FIELD

The present invention relates to the field of transformation of black liquors.

The invention is particularly interesting since it allows valorising the carbon in the form of methane and recovering the sulphur in the aqueous phase.

It finds applications, not only in paper pulp factories, but also for so-called "Power to Gas" sectors

PRIOR ART

In the current contexts of sustainable development, it is essential to be able to valorise the organic residues of the paper industry and, more particularly, black liquor.

Black liquor originates from the preparation of paper pulp. It results from the separation of cellulose (paper pulp) from the rest of the wood (wood pulp). Black liquor contains lignin and hemicellulose and has a high energy content.

In general, the obtained black liquor is burned afterwards in a recovery boiler (called a Tomlinson boiler) not only to produce heat but also to destroy the organic fraction and to recover the baking chemicals, sodium and sulphur.

However, this boiler has several drawbacks: on the one hand its cost and its complexity, and on the other hand carbon dioxide and sulphur are transformed into sulphur oxide and sulphate, which are difficult to valorise.

Alternatively, it is possible to replace the recovery boiler with a supercritical water gasifier to gasify the black liquor, rather than burning it. It is then possible to recover a portion of the carbon in the form of methane or syngas to produce fuels.

But gasification at low temperatures (typically in the range of 500-600° C.) leads to a low conversion and produces a lot of methane. Higher temperatures improve the yield of the conversion but the production of hydrogen and $CO_2$ is also promoted [1].

In this case, it is possible to also use methanation reactors to make the $CO_2$ (or CO) produced during gasification react with hydrogen to obtain methane according to the following reaction:

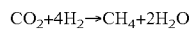
$$CO_2 + 4H_2 \rightarrow CH_4 + 2H_2O$$

This reaction may be catalysed by catalysts based on nickel or ruthenium at temperatures of 300-400° C. [2].

However, such catalysts are sensitive to pollutants, and in particular to sulphur, and are easily deactivated under supercritical conditions [3]. In order to overcome this drawback, one solution consists in using the catalysts in the presence of a purified gas, but this complicates the process.

In addition, supercritical water gasification is endothermic. Hence, a certain amount of heat has often to be provided, for example with heating collars positioned outside the gasification reactor. This heating mode limits the amount of $CO_2$ produced and increases yields. However, when the capacity of the reactor becomes too large, this heating mode becomes complicated.

Otherwise, it is possible to add an oxidant (auto-thermal mode) to supply heat, but this consumes a portion of the resource and produces additional $CO_2$, thereby lowering the syngas yield [4].

Finally, upon cooling, the water condenses and the $H_2S$ and $CO_2$ gases form an equilibrium in the aqueous phase. The sulphur is then distributed into $H_2S$, NaHS and $Na_2S$. Yet, $H_2S$ is a toxic gas; its presence therefore requires an additional step of purification and reinjection into the cycle of the paper pulp factory. The $CO_2$ is distributed into $CO_2$, $H_2CO_3$, $NaHCO_3$ and $Na_2CO_3$. The distribution between these products depends in particular on the pH, the temperature and the ratio between the two gases $CO_2$ and $H_2S$. In a reactor, heated electrically from the outside, about 50% of the sulphur remains in the aqueous phase in the form of sulphide ions $S^{2-}$ or hydrogen sulphide ions $HS^-$. In the auto-thermal mode, only 30% of the sulphur remains in the aqueous phase.

DISCLOSURE OF THE INVENTION

The present invention aims to provide a method allowing transforming carbon into methane, while ensuring that the sulphur remains in a form reusable in the paper pulp factory, with a minimum of losses.

For this purpose, the present invention provides a method for transforming a black liquor comprising the following steps:
  supplying a black liquor,
  b) carrying out a supercritical water gasification of the black liquor, whereby reaction products are formed,
  c) cooling the reaction products, whereby a gaseous mixture is obtained comprising at least methane and a green liquor comprising at least sulphur in the form of NaHS, $Na_2S$ and $H_2S$,
  the gasification being carried out in the presence of a carbon-free hydrogenated fuel.

The invention differs fundamentally from the prior art by the addition of a carbon-free hydrogenated fuel in the supercritical water gasification step, allowing improving the conversion of the sulphur and fixing it in the aqueous phase. The sulphur remains in the aqueous phase at more than 80%, and possibly at more than 95% molar mainly in the form of a mixture of NaHS, $Na_2S$ and $H_2S$. This mixture is easy to reuse, for example, in a Kraft process.

Moreover, the addition of this particular hydrogenated fuel not only produces heat but also improves the conversion of $CO_2$, derived from the gasification of the black liquor, into methane.

This fuel is not only used for the gasification reaction of the black liquor but also allows implementing the methanation reaction.

According to a first variant, the carbon-free hydrogenated fuel is dihydrogen ($H_2$). The use of hydrogen is particularly advantageous because it does not increase or barely increases the costs of the method. In addition, with such a method, the amount of hydrogen necessary to produce methane is reduced.

According to a second variant, the carbon-free hydrogenated fuel is hydrazine (also called diazane $N_2H_4$).

According to a third alternative embodiment, the carbon-free hydrogenated fuel is ammonia (gaseous $NH_3$).

According to a particular embodiment, the gasification step b) is carried out without any supply of oxidant. There is no need to add an oxidant in the supercritical water gasification reactor to recover the sulphur.

According to another particular embodiment, the gasification is carried out in the presence of carbon-free hydrogenated fuel and in the presence of an oxidant. Advantageously, the oxidant is selected from among dioxygen, $H_2O_2$ and mineral matters containing dioxygen, for example nitrates. It could also consist of perchlorates. Advantageously, the dioxygen is used in a liquid form.

Advantageously, the dioxygen originates from an electrolyser.

Advantageously, the carbon-free hydrogenated fuel/oxidant molar ratio, and more particularly the $H_2/O_2$ molar ratio, ranges from 2 to 10 and preferably from 5 to 7.

Advantageously, the temperature during the gasification step is at least 600° C., preferably at least 700° C., for example between 700° C. and 800° C., and even more preferably at least 800° C.

Advantageously, the pressure is at least 250 bar (25 MPa), for example between 250 bar (25 MPa) and 350 bar (35 MPa), preferably at least 300 bar (30 MPa), for example between 300 and 350 bar (35 MPa), and even more preferably at least 350 bar (35 MPa).

Advantageously, the temperature during the cooling step c) is comprised between 25° C. and 80° C. and/or the pressure is comprised between 1 (1 MPa) and 20 bars (20 MPa).

The method has several advantages:
not requiring the addition of an oxidant for the supercritical water gasification reaction,
producing heat while limiting the production of $CO_2$,
converting $CO_2$ of the gasification into methane,
fixing the sulphur in the aqueous phase to be able to reuse it, after the gasification process, for example in a Kraft process,
valorising as much as possible the carbon initially present in the black liquor.

Other features and advantages of the invention will arise from the following complementary description.

It goes without saying that this complementary description is given only for illustration of the object of the invention and should in no way be interpreted as a limitation of this object.

BRIEF DESCRIPTION OF THE DRAWINGS

The present invention will be better understood upon reading the description of embodiments given merely for indicative and in non-limiting purposes with reference to the appended drawings wherein.

The different portions represented in the figures are not necessarily plotted according to a uniform scale, to make the figures more readable.

Furthermore, in the description hereinafter, terms that depend on orientation, such as "top"/"upper", "bottom"/ "lower", etc., of a structure apply while considering that the gasification device is oriented as illustrated in the figures.

DETAILED DISCLOSURE OF PARTICULAR EMBODIMENTS

The method for gasifying black liquor in supercritical water comprises the following steps:
supplying a black liquor,
b) carrying out a supercritical water gasification of the black liquor in the presence of a carbon-free hydrogen fuel, whereby reaction products are formed,
c) cooling the reaction products, whereby are obtained on the one hand a gaseous mixture comprising at least methane and, on the other hand, a green liquor comprising at least sulphur in the form:

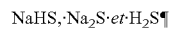

$NaHS, \cdot Na_2S \cdot et \cdot H_2S$

The black liquor supplied at step a) contains dissolved sodium salts (hydroxides and/or sulphites) and organic matter (mainly lignin). Other inorganic salts may be present. For example, these may consist of salts that are extracted from wood, such as potassium (for example from 5 to 10 g/L) and/or traces (for example from 0.1 to 0.5 g/L) of calcium and magnesium. The organic matter may also contain sugar derivatives and/or anions of carboxylic acids. These other organic compounds will have a similar effect in gasification.

Advantageously, before the gasification step b), the black liquor is preheated (in contrast with cooling of the supercritical mixture), preferably at a temperature between 300° C. and 400° C., for example between 300° C. and 350° C. This preheating saves energy.

Figure 1:
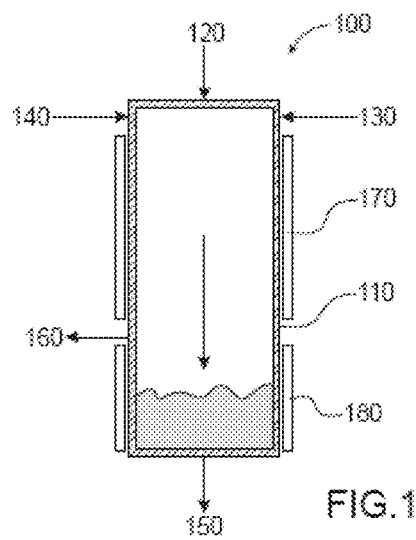
FIG. 1 represents, schematically and in section, a supercritical water gasification device for black liquor, according to a particular embodiment of the invention.
Figure 2:
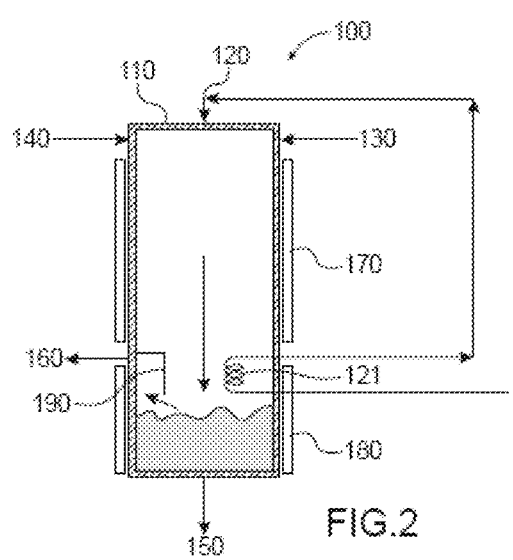
FIG. 2 represents, schematically and in section, a supercritical water gasification device for black liquor, according to another particular embodiment of the invention.

During step b), the gasification of the black liquor is carried out in a supercritical medium in a gasification device 100. As represented in FIGS. 1 and 2, the gasification device 100 may comprise a reactor 110 provided with:
a main fuel inlet 120 (black liquor),
an additional fuel inlet 130, the additional fuel being a carbon-free hydrogenated fuel such as $H_2$, ammonia or hydrazine,
preferably an oxidiser inlet 140, the oxidiser being an oxidant which may be selected from among $O_2$, $H_2O_2$ or a mineral material such as a nitrate,—a green liquor outlet 150, derived from the gasification reaction of the black liquor,
a gas outlet 160 allowing evacuating a gas mixture.

The upper portion of the reactor 110 is heated to be able to implement the gasification step.

Heating of the upper portion is carried out by heating means 170 allowing heating the upper portion of the reactor to a temperature comprised between 400° C. and 800° C. For example, it is possible to have a reactor with a double-jacket wall. Heating is then obtained by a heat-transfer fluid flowing in the double-jacket wall.

For example, the portion of the reactor where the supercritical water gasification reaction takes place (portion under supercritical conditions) has a volume of about 1 m³.

For a larger capacity, an additional heating, positioned outside the capacity, will advantageously be used.

Advantageously, the black liquor inlet 120 is positioned in the upper portion of the reactor.

According to one variant, the black liquor supply line may pass through the reactor 110 for example, in the form of a serpentine 121 before opening into the reactor 110 (FIG. 2).

The oxidiser inlet 140 and the additional fuel inlet 130 are positioned in the upper portion of the reactor 110.

The oxidiser inlet 140 may be connected to an electrolyser, producing oxygen and positioned upstream of the reactor 110.

The lower portion of the reactor is at a temperature lower than that of the upper portion (typically at a temperature lower than that of water in the supercritical state) to cool the reaction products so as, on the one hand, to solubilise the mineral matter, in the form of brine (green liquor), and, on the other hand, to obtain a gaseous mixture.

The lower portion is cooled with cooling means 180 allowing cooling the lower area of the reactor to a temperature lower than 374° C. For example, the cooling may be obtained thanks to the circulation of a heat-transfer fluid in the double-jacket wall of a reactor.

For example, the volume of the lower portion where the cooling takes place (portion under subcritical conditions) is smaller than the volume of the portion under supercritical conditions.

Advantageously, the outlet of the gas mixture and the outlet of the green liquor are positioned in the lower portion of the reactor.

Advantageously, as represented in FIG. 2, the device 100 comprises guide means 190 positioned between the upper portion and the lower portion to facilitate the discharge of gases.

The reactor also comprises pressure regulating means (not represented) to maintain the entire reactor at a pressure higher than or equal to 22.1 MPa, for example ranging from 22.1 MPa to 40.0 MPa.

The gasification device may also comprise equipment and instruments for automatically regulating the pressure of the reactor up to 40.0 MPa and even more, and for ensuring the depressurisation of the outflow, for a downstream pressure ranging for example from 0.1 to 0.5 MPa absolute.

The device may also comprise safety equipment, such as valves for example.

The wall of the reactor is made of a heat-conductive and pressure-bearing material. For example, the wall may be made of Inconel (for example a nickel-chromium 625 alloy).

The device may also comprise shut-off valves to open/close the reactant or product lines.

A frame, not represented, may be used to support the assembly.

The reactor may comprise a pressure-resistant separation (cold walls) and/or a transpiring inner wall ("transpiring wall").

The reactor could be connected to a horizontal exchanger to condense the water.

An electrolyser may be positioned upstream of the reactor, to supply the reactor with oxygen and hydrogen.

For example, the reactor may be a vertical reactor of the tubular type.

The gasification step b) is carried out under temperature and pressure conditions such that the water is in the supercritical state. By water in the supercritical state, it should be understood water that is beyond its critical point, i.e. heated to a temperature higher than 374° C. and at a pressure higher than 221 bar (22.1 MPa).

Preferably, during step b), the temperature is at least 600° C., preferably at least 700° C. or even more preferably at least 800° C. The pressure is at least 250 bar (25 MPa), and preferably at least 300 (30 MPa) and possibly at least 350 bar (35 MPa).

The gasification step is carried out in the presence of a carbon-free hydrogenated fuel (i.e. a fuel containing no carbon atoms and containing at least one hydrogen atom). For example, it may consist of $H_2$, $N_2H_4$ or $NH_3$. Preferably it consists of dihydrogen.

Advantageously, the gasification step is also carried out in the presence of an oxidant. Preferably, the oxidant is dioxygen.

Advantageously, during gasification, a flow of carbon-free hydrogenated fuel, and possibly a flow of oxidant, circulate in the capacity with a flow rate ranging for example from 0.1 to 5 L/s. For example, the flow rate is 1 L/s.

Preferably, during step b), only the black liquor is gasified. Alternatively, other carbonaceous sources may be present during the gasification process such as sludge from a purification station, or water polluted with hydrocarbons.

During gasification, the organic matter decomposes, and gasifies to produce hydrogen, methane, carbon dioxide and carbon monoxide. The sulphur is transformed into $H_2S$.

The inorganic matter precipitates, in the form of salts, in the upper area of the reactor and falls by gravity into the lower portion of the reactor, colder, where it is solubilised again and where it could be evacuated.

Thus, the reaction products are cooled (step c) and a gaseous mixture, on the one hand, and a green liquor, on the other hand, are obtained.

The gaseous mixture contains methane, carbon dioxide, dihydrogen and hydrogen sulphide.

The green liquor is a mixture of water and baking salts. The green liquor comprises sulphur in the form of NaHS, $Na_2S$ and $H_2S$.

For example, the green liquor has a pH comprised between 8.5 and 11.9.

Advantageously, the green liquor is subsequently transformed into white liquor. The transformation may, for example, comprise a step during which calcium hydroxide is added to form calcium carbonate and soda.

Advantageously, the method is carried out without a catalyst.

The present invention is particularly interesting for paper pulp factories instead of or complementarily with the black liquor combustion process. Indeed, even a very optimised combustion leads to losses of sodium and sulphur ($SO_2$, $SO_3$ and sodium sulphate). The present invention leads to an efficient recovery of sodium and sulphur from the paper pulp factory. In addition, with this supercritical water gasification process, a large portion of the carbon initially present in the black liquor is released in the form of methane. The produced methane may be injected into the urban gas network. The produced syngas may be used to synthesise biofuels.

In particular, the present invention is particularly interesting for the "Power to Gas" sector in which hydrogen is produced by electrolysis, with an excess electric power. Afterwards, the hydrogen thus obtained may be combined with $CO_2$ directly derived from the gasification to valorise it in the form of methane.

Illustrative and Non-Limiting Examples of One Embodiment

Black liquors derived from the Kraft process may have a very variable composition. For the following calculations, the composition of the used black liquor is reported in the following table:

| | |
|---|---|
| Dry matter concentration of the Black Liquor (BL) | 200 g/L |
| Including Inorganic (NaOH, $Na_2S$) | 120 g/L |
| Including Organic | 80 g/L |
| Carbon | 5 mol/L |
| Hydrogen (excluding water) | 8 mol/L |
| Oxygen (excluding water) | 1 mol/L |

-continued

| | |
|---|---|
| Nitrogen | 0.1 mol/L |
| Sulphur | 0.3 mol/L |
| HCV (organic matter) | 30 MJ/kg |

The acronym HCV stands for Higher Calorific Value.

For example, the used supercritical water gasification device 100 is that one represented in one of FIG. 1 or 2.

The reaction mixture formed from the black liquor is introduced into the reactor.

In a first step, the black liquor is pressurised to 300 bar and preheated to 600 K (327° C.).

Then, the gasification is done at 1,073 K (800° C.).

After gasification, the reactor is cooled. As they cool down, the gases condense. The $CO_2$ and the $H_2S$ will be distributed between the condensed phase and the gas phase. The $CO_2$ produces a stronger acid than the $H_2S$ and will therefore prevent $H_2S$ from fixing in water.

The same experiment has been repeated by adding oxygen, hydrogen or oxygen and hydrogen in the gasification reactor.

In the case of the addition of oxygen and hydrogen, two different pressures (1 bar and 20 bar) and two different temperatures (300 K and 350 K) have been used for the separation conditions.

The results are given in the following table:

| | BL alone - ref | BL + $O_2$ | BL + $O_2$ + $H_2$ | BL + $O_2$ + $H_2$ | BL + $H_2$ | BL + $O_2$ + $H_2$ | BL + $O_2$ + $H_2$ |
|---|---|---|---|---|---|---|---|
| Case 1 L/sec | | | | | | | |
| $O_2$ need (mols) | 0 | 1.84 | 1.68 | 1.68 | 0 | 1.68 | 1.68 |
| $H_2$ need (mols) | 0 | 0 | 10 | 10 | 10 | 10 | 10 |
| Electric power (MW) | 2 | 0 | 0 | 0 | 3.4 | 0 | 0 |
| Gasification gases (mol/s) | | | | | | | |
| CO | 0 | 0 | 0 | 0 | 0 | 0 | 0 |
| $CO_2$ | 2.52 | 3.36 | 1.23 | 1.23 | 0.60 | 1.23 | 1.23 |
| $H_2$ | 2.83 | 2.49 | 46.2 | 46.2 | 5.13 | 46.2 | 46.2 |
| $CH_4$ | 2.46 | 1.62 | 3.75 | 3.75 | 4.39 | 3.75 | 3.75 |
| $H_2S$ | 0.3 | 0.3 | 0.3 | 0.3 | 0.3 | 0.3 | 0.3 |
| Salts in water (mol/s) | | | | | | | |
| Separation condition | 300 K, 1 bar | 300 K, 1 bar | 300 K, 1 bar | 350 K, 20 bar | 300 K, 1 bar | 350 K, 1 bar | 300 K, 20 bar |
| pH | 8.82 | 8.58 | 9.63 | 9.02 | 11.85 | 9.72 | 8.90 |
| NaOH | 5E−6 | 3E−6 | 4E−5 | 5E−6 | 0.006 | 4E−5 | 6E−6 |
| $NaHCO_3$ | 1.27 | 1.34 | 0.92 | 1.06 | 0.02 | 0.72 | 1.13 |
| $NaCO_3$ | 0.036 | 0.021 | 0.17 | 0.077 | 0.58 | 0.17 | 0.04 |
| NaHS | 0.155 | 0.12 | 0.25 | 0.287 | 0.29 | 0.26 | 0.28 |
| $Na_2S$ | 4E−6 | 2E−5 | 5E−5 | 4E−4 | 0.0009 | 0.002 | 0.00001 |
| $H_2S$(aq) | 0.002 | 0.003 | 0.0004 | 0.0008 | 0.002 | 0.00015 | 0.0028 |
| $S_{tot}$ | 0.15 | 0.12 | 0.25 | 0.29 | 0.3 | 0.26 | 0.28 |
| Cold gases (mol/s) | | | | | | | |
| $CO_2$ | 1.21 | 1.99 | 0.15 | 0.092 | 1.21 | 0.25 | 0.05 |
| $H_2S$ | 0.143 | 0.18 | 0.046 | 0.011 | 0.0003 | 0.046 | 0.013 |
| $H_2$ | 2.83 | 2.49 | 4.28 | 4.28 | 5.13 | 4.28 | 4.28 |
| $CH_4$ | 2.46 | 1.62 | 3.75 | 3.75 | 4.39 | 3.75 | 3.75 |

In the previous table, $S_{tot}$ corresponds to the sum of $Na_2S+NaHS+H_2S$.

In the so-called reference process (without addition of dihydrogen and/or dioxygen), the need for an additional heating, before the gasification step, amounts to about 2 MJ per litre of black liquor.

By adding oxygen alone, a portion of the resource is consumed to produce heat. One could observe that the production of hydrogen and methane is reduced.

By adding oxygen and hydrogen, heat is supplied by the consumption of hydrogen. The significant LCV of hydrogen leads to a decrease in oxygen consumption. A considerable portion of the hydrogen is consumed by the methanation reaction with $CO_2$. The amount of carbon dioxide at the end of the process is lower and the produced amount of methane is larger than in the case where only oxygen is added.

By adding dihydrogen alone, the results are even better.

By increasing the pressure during the separation step, more sulphur is fixed in the aqueous phase (the solubility of $H_2S$ is favoured).

By increasing the temperature, the pH increases slightly and more sulphur is also fixed in the aqueous phase.

In the auto-thermal case with the addition of oxygen alone and with the addition of oxygen and hydrogen, the consumption amounts to 5.72 moles of hydrogen per second, 4.38 moles of $H_2$ comes out of the reactor without being consumed and advantageously allows pushing the equilibrium of the reaction in the reactants→products direction. The gasification of the black liquor also produces $H_2$. To produce 3.75 moles of $CH_4$ as observed, 1.5 moles of hydrogen are therefore consumed per mole of $CH_4$ produced. Hence, the rest originates from the black liquor. For comparison, in a conventional methanation reaction, 4 moles of hydrogen are consumed.

In addition, this allows heating the reactor and obtaining the sulphur in the aqueous phase.

Sodium is present in the aqueous phase in a form that is easy to reuse, primarily as NaHS and $Na_2S$. Hence, it is possible to recycle it effectively. There will be no or very little loss of sulphur (in the form of sulphur dioxide or sulphates) in this method.

APPENDIX

[1] Cao, W., et al., *Assessment of sugarcane bagasse gasification in supercritical water for hydrogen production*. International Journal of Hydrogen Energy, 2018. 43(30): p. 13711-13719.

[2] Lunde, P. J. and F. L. Kester, *Carbon Dioxide Methanation on a Ruthenium Catalyst*. Industrial & Engineering Chemistry Process Design and Development, 1974. 13(1): p. 27-33.

[3] Frusteri, F., et al., *Methane production by sequential supercritical gasification of aqueous organic compounds and selective CO2 methanation*. Applied Catalysis A: General, 2017. 545: p. 24-32.

[4] Hong, G. T. and M. H. Spritzer, *Supercritical Water Partial Oxydation, in Proceedings of the* 2002 *U.S. DOE Hydrogen Program Review* 2002

What is claimed is:

1. A method for transforming a black liquor comprising the following steps:
   a) supplying a black liquor,
   b) carrying out a supercritical water gasification of the black liquor, whereby reaction products are formed,
   c) cooling the reaction products, whereby are obtained a gaseous mixture is obtained comprising at least methane, and
   a green liquor comprising at least sulphur in the form of NaHS, $Na_2S$ and $H_2S$,
   wherein the supercritical water gasification is carried out by addition in step b) of a carbon-free hydrogenated fuel.

2. The method according to claim 1, wherein the carbon-free hydrogenated fuel is dihydrogen.

3. The method according to claim 1, wherein the carbon-free hydrogenated fuel is hydrazine.

4. The method according to claim 1, wherein the carbon-free hydrogenated fuel is ammonia.

5. The method according to claim 1, wherein the supercritical water gasification is carried out by addition in step b) of the carbon-free hydrogenated fuel and of an oxidant.

6. The method according to claim 5, wherein the oxidant is dioxygen, $H_2O_2$ or a nitrate.

7. The method according to claim 5, wherein the carbon-free hydrogenated fuel/oxidant molar ratio ranges from 2 to 10.

8. The method according to claim 7, wherein the carbon-free hydrogenated fuel/oxidant molar ratio ranges from 5 to 7.

9. The method according to claim 1, wherein the temperature during the supercritical water gasification step b) is at least 600° C.

10. The method according to claim 9, wherein the temperature during the supercritical water gasification step b) is between 700° C. and 800° C.

11. The method according to claim 1, wherein the pressure during the supercritical water gasification step b) is at least 25 MPa.

12. The method according to claim 11, wherein the pressure during the supercritical water gasification step b) is between 25 MPa and 350 MPa.

13. The method according to claim 12, wherein the pressure during the supercritical water gasification step b) is between 300 MPa and 350 MPa.

14. The method according to claim 1, wherein the cooling during step c) is carried out at a temperature comprised between 25° C. and 80° C. and/or the pressure is comprised between 1 and 20 MPa.

15. The method according to claim 1, wherein the method is carried out without a catalyst.

* * * * *